(12) United States Patent
Patel et al.

(10) Patent No.: US 10,621,162 B2
(45) Date of Patent: Apr. 14, 2020

(54) STORAGE TIER VERIFICATION CHECKS

(71) Applicant: NetApp Inc., Sunnyvale, CA (US)

(72) Inventors: Kayuri Hasmukh Patel, Cupertino, CA (US); Qinghua Zheng, San Jose, CA (US); Sumith Makam, Bangalore (IN); Kevin Daniel Varghese, Santa Clara, CA (US); Yuvraj Ajaykumar Patel, Madison, WI (US); Sateesh Kumar Pola, Bangalore (IN); Sharmi Suresh Kumar Nair, Bangalore (IN); Mihir Gorecha, Gujarat (IN)

(73) Assignee: NetApp Inc., Sunnyvale, CA (US)

( * ) Notice: Subject to any disclaimer, the term of this patent is extended or adjusted under 35 U.S.C. 154(b) by 400 days.

(21) Appl. No.: 15/624,891

(22) Filed: Jun. 16, 2017

(65) Prior Publication Data

US 2018/0365281 A1 Dec. 20, 2018

(51) Int. Cl.
*G06F 16/23* (2019.01)
*G06F 16/13* (2019.01)
*G06F 16/14* (2019.01)

(52) U.S. Cl.
CPC ......... *G06F 16/2365* (2019.01); *G06F 16/13* (2019.01); *G06F 16/148* (2019.01)

(58) Field of Classification Search
None
See application file for complete search history.

(56) References Cited

U.S. PATENT DOCUMENTS

| 8,713,356 | B1* | 4/2014 | Chan | G06F 11/2247 |
| | | | | 714/6.1 |
| 2003/0212920 | A1* | 11/2003 | Fujibayashi | G06F 11/1456 |
| | | | | 714/6.32 |
| 2005/0038803 | A1* | 2/2005 | Edwards | G06F 16/10 |
| 2008/0189343 | A1* | 8/2008 | Hyer | G06F 3/0614 |
| 2017/0123928 | A1* | 5/2017 | Smith | G06F 11/1435 |

\* cited by examiner

*Primary Examiner* — Robert W Beausoliel, Jr.
*Assistant Examiner* — Hau Hoang
(74) *Attorney, Agent, or Firm* — Cooper Legal Group, LLC

(57) ABSTRACT

Techniques are provided for storage tier verification checks. A determination is made that a mount operation of an aggregate of a set of volumes stored within a multi-tier storage environment has completed. A first metafile and a second metafile are maintained to track information related to the storage of objects of a volume of the aggregate within a remote object store that is a tier of the multi-tier storage environment. A distributed verification is performed between the first metafile and the second metafile to identify an inconsistency. Accordingly, the first metafile and the second metafile are reconciled to address the inconsistency so that storage information within the first metafile and the second metafile are consistent.

20 Claims, 11 Drawing Sheets

STORAGE TIER VERIFICATION CHECKS

BACKGROUND

Many storage systems may provide clients with access to data stored within a plurality of storage devices. For example, a storage controller may store client data within a set of storage devices that are locally accessible (e.g., locally attached to the storage controller) or remotely accessible (e.g., accessible over a network). A storage aggregate of storage (e.g., a composite aggregate comprising a set of volumes) may be generated from the set of storage devices (e.g., the storage aggregate may be stored across one or more storage devices). The storage aggregate may be exported from a storage file system to a client. The storage aggregate may appear as one or more storage containers to the client, such as a volume or logical unit number (lun). In this way, the storage aggregate abstracts away the details, from the client, of how the storage aggregate is physically stored amongst the set of storage devices.

Some storage systems may store data within a multi-tiered storage environment. For example, the storage controller may store data within a hard disk drive tier and a solid state storage tier. The hard disk drive tier may be used as a capacity tier to store client data and for processing input/output operations. The solid state storage tier may be used as a cache for accelerating the processing of storage operations. Different storage tiers have different characteristics and behaviors, which can affect performance and guarantees provided to clients by a storage system.

In an example, a storage system may utilize a storage tier (e.g., a local storage tier hosted, owned, and/or managed by one or more nodes of a storage environment associated with the storage system) and a remote object store as two of the storage tiers within which the storage system stores data. The storage system may be able to provide high availability, security, data consistency, data protection, and/or other guarantees using the storage tier because the storage system may manage and control the storage tier. However, the storage system may be unable to provide similar guarantees, such as that data is properly stored, managed, is consistent, and is accurate, to clients for the remote object store because the storage system does not manage and control the remote object store (e.g., a third party provider may host and manage the remote object store). For example, new data could be written to a remote third party object store. When reading the new data, old data or no data could be returned by the remote third party object store due to delay. Thus, the storage system may be unable to provide the same level of enterprise guarantees and efficiencies when working with the remote third party object store as backend storage.

DETAILED DESCRIPTION

Figure 1:
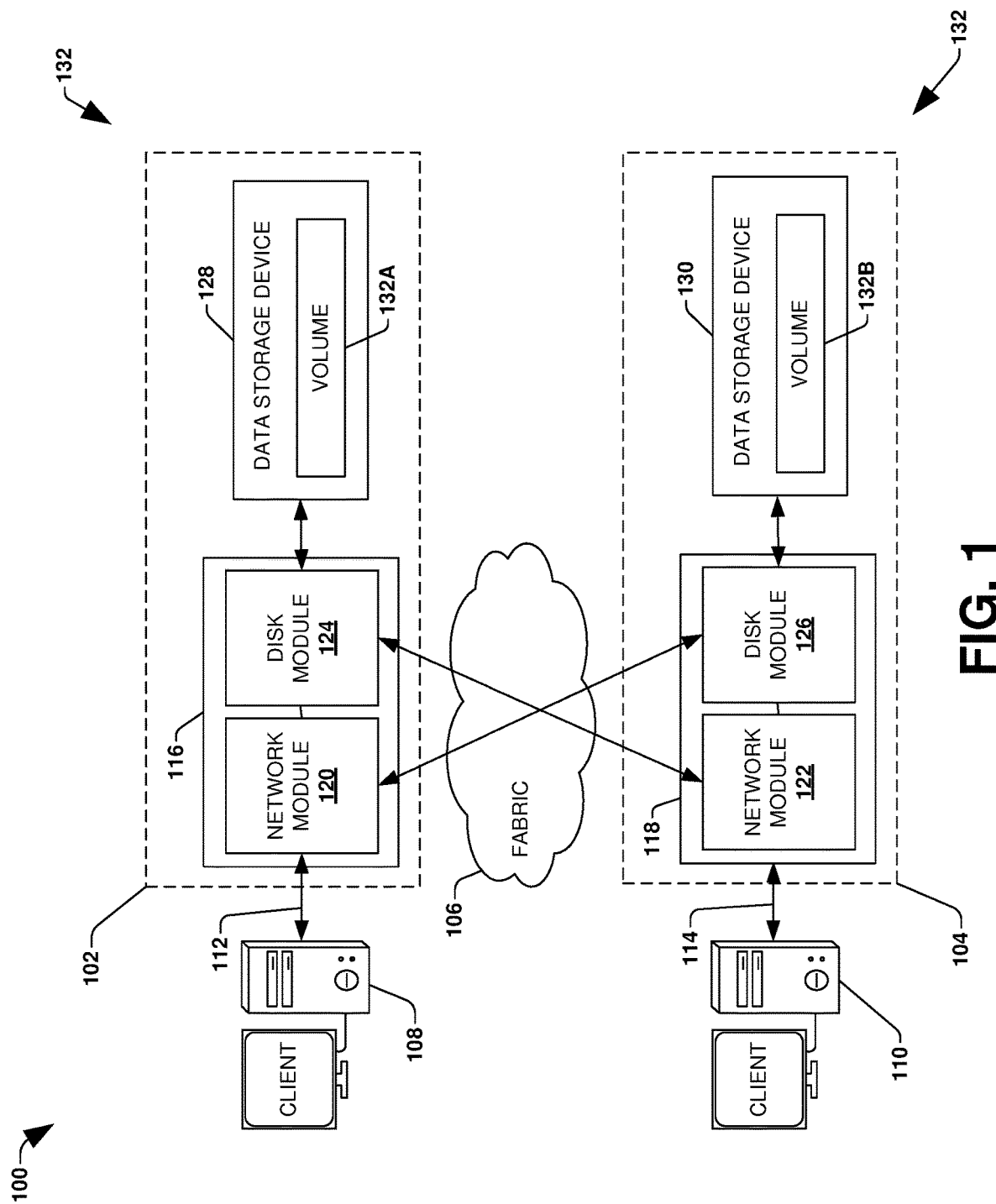
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for storage tier verification checks are provided herein. A storage system may utilize multiple tiers of storage to store client data. For example, the storage system may utilize a first storage tier (e.g., a performance storage tier, such as a solid state storage tier or a hard disk drive storage tier, locally hosted and/or maintained by nodes of a storage environment associated with the storage system), a second storage tier such as a remote object store (e.g., a distributed network of storage provided by a third party provider, a capacity tier, cloud storage, etc.), and/or other tiers of storage.

Unfortunately, the remote object store may not provide adequate guarantees of data validity and consistency that the storage system guarantees for clients. For example, the remote object store may return old data instead of newly written data due to delays. In another example, the remote object store may return an object not found response for the newly written data due to delays. Other issues can arise when metafiles used by the storage system to manage the storage of object to the remote object store become corrupt or inconsistent.

Accordingly, as provided herein, storage tier verification checks of metafiles and/or other information is provided by the storage system. In particular, a volume information metafile and/or a staging area information metafile are verified during a mount operation of a volume. A distributed verification of other metafiles, such as an object information metafile, a staging area metafile, an object reference metafile, and/or an object map metafile, may be delayed until after the mount operation. Client access operations may be allowed during the distributed verifications.

Because the volume information metafile and/or the staging area information metafile may be relatively quick and efficient to verify, such verification can be performed during the mount operation without introducing significant delay for completing the mount operation. Reducing the time to complete the mount operation is beneficial because clients cannot access the aggregate until after the mount operation has completed. Any inconsistencies identified during the verifications may be addressed (e.g., information within a metafile may be cleared or modified to make the metafile consistent with other metafiles) so that the metafiles are consistent.

To provide for storage tier verification checks, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that storage tier verification checks may be implemented within the clustered network environment 100. In an example, the node 116 and/or the node 118 may utilize a multi-tier storage environment such as a remote object store and/or the data storage devices 128, 130 for serving client requests. It may be appreciated that storage tier verification checks may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
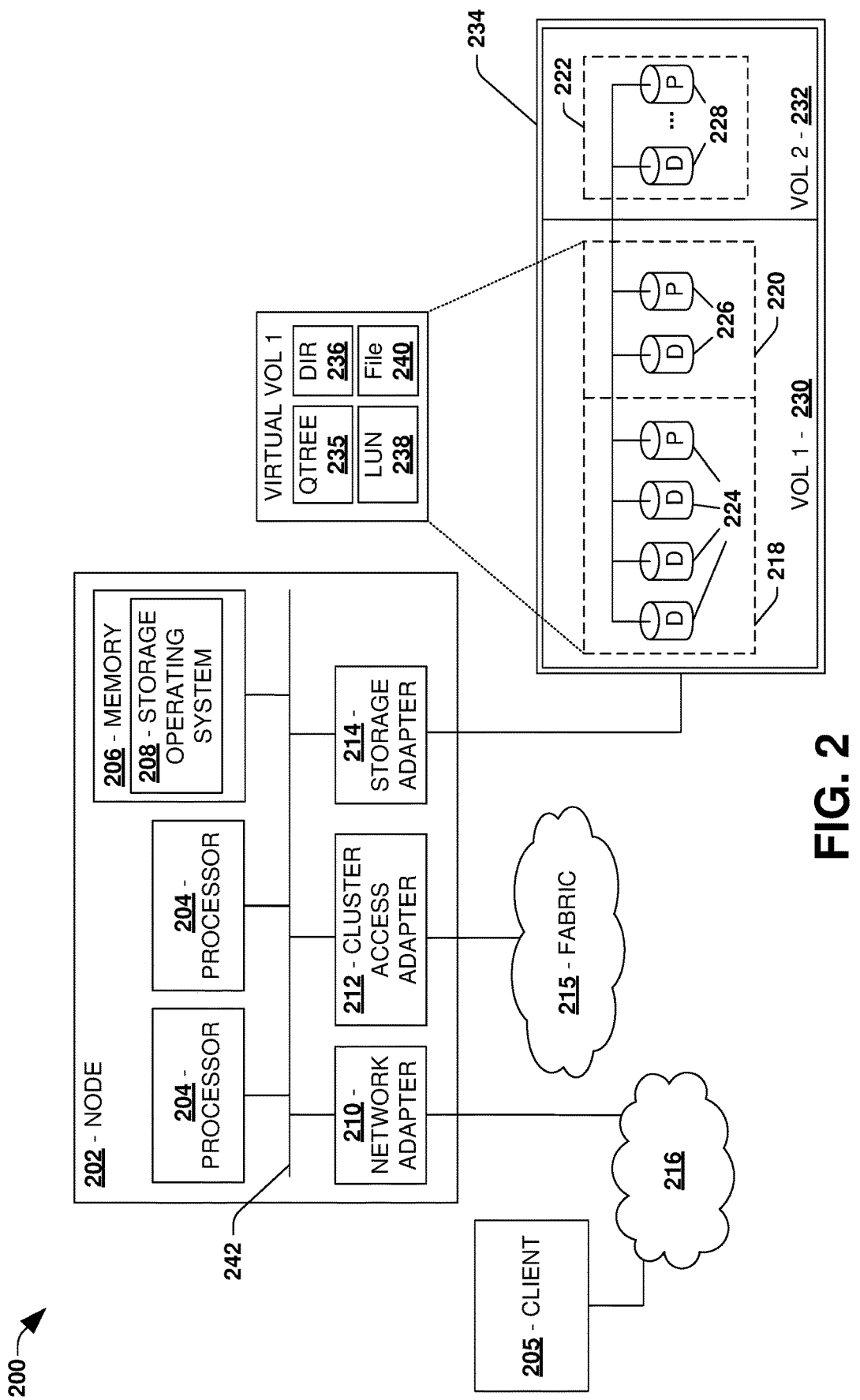
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that storage tier verification checks may be implemented for the data storage system 200. In an example, the node 202 may utilize a multi-tier storage environment such as a remote object store and/or other storage tiers for serving client requests. It may be appreciated that storage tier verification checks may be implemented for and/or between any type of computing environment, and may be transferable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Various issues can arise when verifying consistency of a file system. A wafliron technique performs local checks to check sanity (e.g., correctness) of any block without looking at any other block in a filesystem. Distributed checks are performed to verify the consistency of the block by looking at different blocks in the filesystem. As wafliron has to load multiple blocks as part of ironing a single block, client latencies goes up.

In one embodiment, lazy distributed checks are provided for verifying/ironing data. Ironing an entire file before providing access to the file can cause clients to timeout because of the extensive amount of time taken to iron the entire file. Thus, the real time-to-data availability for files is when the whole file is completely ironed. This depends on the size of the file and position of the file in the queue for ironing. This amount of downtime is not acceptable for clients. Accordingly, as provided herein, enhanced avoidance techniques are provided so that minimal checks/verifications in a client path can be performed while leaving distributed checks to the background (e.g., distributed checks to verify consistency of a block of data; distributed checks of metafiles that may be interdependent upon one another, such as metafiles used to manage the storage of data within multiple tiers of storage; etc.). That is, a focus is on how to decouple the distributed checks from a frontend (e.g., a frontend that interfaces with clients).

The following are some of the distributed checks that iron does which results in client latencies going up. One example relates to claiming a block. Whenever wafliron sees a block in an indirect it claims the block by setting a bit in its status file. This will help in detecting doubly linked blocks. As part of doing this, wafliron has to load claimed status file. As part of ironing one indirect, wafliron might have to load around 255 claimed status file blocks. In case of vvol wafliron has to load another 255*510 claimed status file blocks as wafliron has to verify container L1 corresponding to a vvbn. As part of claiming a block, there is also a block accounting. This block accounting is needed to verify various on-disk space counters. Another example relates to container pvbn checks. In case of vvols, a copy of the pvbn is cached in the vvol indirect. So, wafliron has to go and verify if the pvbn present in the vvol indirect is same as the one in the container file or not. To do this, wafliron has to load the container L1

It may be desirable to stop these distributed checks. This is fine if there can only be hardware (HW) errors. HW errors are easy to detect, as any bitflips will cause checksum-error or WAFL lost-write checks will catch other types of errors. But, software (SW) errors, which can occur because of logic bugs or scribbles, cannot be caught. So, enough filesystem avoidance features have been developed to prevent SW bugs hitting the disk.

Because of deferring some distributed checks to background wafliron, there will be significant reduction in the client request latencies. Apart from reduction in client latencies, this feature also helps in defining quality of service (QOS) policies for wafliron. That is, wafliron currently tries to verify all the blocks before any block is returned to clients. So, it's hard to control wafliron independently. This feature will make wafliron completely a background job without coming in the way of client requests. This will help in having separate QOS policies for wafliron, i.e., letting wafliron run faster when there is not much load on a filer/node or slowing down wafliron whenever there is too much of load on the filer.

The feature brings a change in the perception of wafliron serving consistent data. Even though inconsistent data can be served before starting wafliron, consistent and correct data will be served once wafliron starts. This implies that data served while wafliron is running will remain unchanged. With this feature, as wafliron will be running in the background, data served to clients can change after it is served to clients. A window is extended where inconsistent data can be served from beginning of wafliron to end of wafliron.

Accordingly, as provided herein, distributed checks are deferred to a background along with new avoidance mechanism an incremental checksum (IC) and an incremental consistency checker (ICC) being provided. IC will help in protecting against SW scribbles and ICC will help in protecting against SW logic bugs.

There could be hardware errors or logic bugs which can escape avoidance layer and so a check is performed to make sure that there are no local inconsistencies. These local checks should be done before giving first access to the clients. This is detailed version of metadata checks, which verifies all the indices for indirect blocks. Additional/detailed checks are done on some metafile L0 blocks too. This is enabled only on debug builds or in non-debug builds when wafliron is running. In debug builds, performance regression is a non-issue and in return there can be a catch more corruption scenarios. During wafliron, lazy distributed checks (LDC) depends on this feature to detect all the local inconsistencies before the buffer is handed over to load path. So, LDC will perform full local checks in this case.

In one example of lazy distributed check where wafliron interaction issues with other operations, wafliron was tightly integrated with the rest of a file system, i.e., wafliron accounting is kept in sync with new allocations and frees that happen in the file system. This required wafliron to do distributed checks before any modifications to the block. By moving the distributed checks to the background, allocation and free path has to be taught whether a particular buffer has been checked by iron or not. Given that a file system free path has multiple stages to really free a block, information about a block being ironed or not has to be carried over to all the stages, which is what increases the complexity of the solution. Some other operations like moving the buftree from one file to another file also has interaction with wafliron's distributed checks. As this is complex to resolve, no LDC is performed during these operations. For inode/volume block accounting, as there cannot be any new writes to a block before it is ironed, old approach of block accounting doesn't differentiate between old blocks and new blocks that got allocated while ironing. Not differentiating will result in reporting new writes as corruption. So, block accounting in iron has been modified to differentiate between old and new blocks.

In one example of making a filesystem resilient to corruptions, inline distributed checks are provided. As writing comprehensive ICC may not be possible in some instances, there can be some distributed checks that are done in the client access. But, code should be made resilient to handle these corruptions and also fix them. These checks are called inline distributed checks. These checks will not add any latency to the client path as zero extra blocks needs to be loaded for doing these checks.

Also, inode/volume block accounting is provided. There are some counters at the volume level which wafliron verifies. As new writes can happen before blocks are accounted by wafliron, there can be overflow or underflow of these counters. So, block accounting code has to be made resilient to not panic in these scenarios.

Also, index based ironing is provided as an enhancement to LDC. With old LDC design, ironing of a buffer and writes to it were mutually exclusive. This resulted in client latencies going up while a particular buffer is being ironed. Also, this old design has caused some functionality interaction issues and was fragile. Primary reason for making writes and ironing mutually exclusive is because of the granularity at which iron information was stored. In the earlier design, iron information was stored at the block level and so till all indices are ironed, no operations which want to know if block is ironed or not have to be suspended. Ironing a block requires all indices to be ironed, which can take lot of time. So, if a higher level indirect is being ironed, no one under that parent can be dirtied till iron is completely done. Accordingly, the granularity of iron information is changed from block level to an index. This helps in allowing client operations even while a block is being ironed. In performance runs, there is a benefit of 100% throughput increase and 70% latency reduction with this feature.

LDC and index based ironing may be used to verify data and metadata associated with tiering data between multiple tiers of storage. For example, LDC and index based ironing may be used to verify/iron metafiles, buftree layouts, and/or other data used to manage the storage of data within a multi-tier storage environment.

Figure 3:
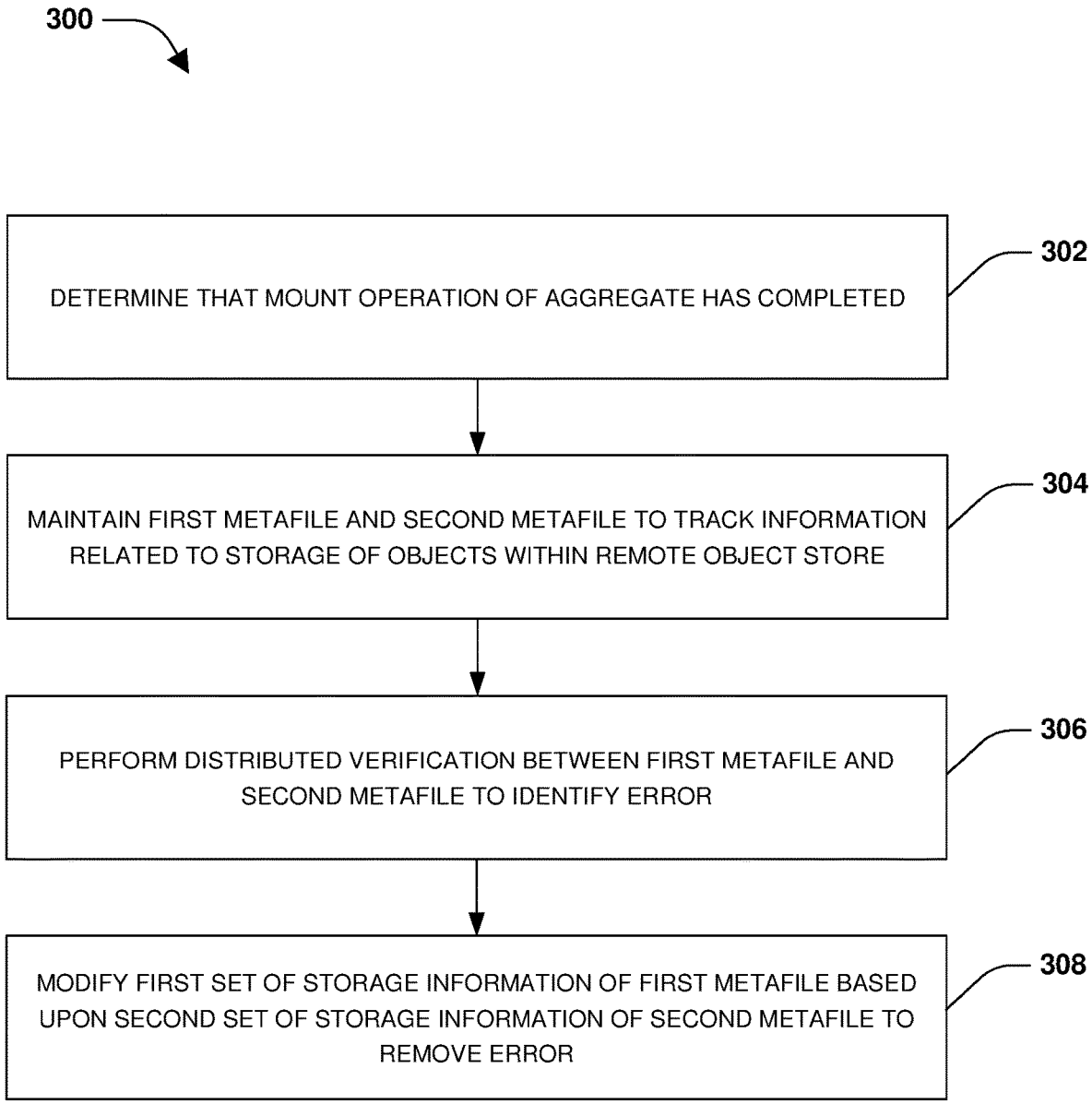
FIG. 3 is a flow chart illustrating an exemplary method of storage tier verification checks.

One embodiment of storage tier verification checks is illustrated by an exemplary method 300 of FIG. 3. A storage system may provide clients with access to client data stored within a backend such as a multi-tier storage environment. The backend may be configured with one or more tiers of storage. For example, the backend may be configured with a first storage tier (e.g., a performance tier, solid state drives, hard disk drives, etc.), a second storage tier such as a remote object store (e.g., a third party storage provider, a capacity tier, cloud storage, etc.), etc.

The storage system may store data within the first storage tier as a performance tier for frequently or recently accessed data because the first storage tier may have lower latency and more guarantees than the second storage tier such as the remote object store. The storage system may migrate data from the first storage tier to the second storage tier (e.g., less frequently or less recently accessed data) or may store new data to the remote object store. In an example, the first storage tier comprises storage devices hosted by a storage environment of the storage system (e.g., clusters of nodes may store data with storage devices owned and managed by such nodes) that manages client access to volumes whose data is stored across the multi-tier storage environment. The second storage tier comprises a remote object store hosted by a third party storage provider and not the storage environment. The first storage tier may have lower latency and improved consistency guarantees than the second storage tier because the storage environment hosts and manages the first storage tier.

The storage system may create a composite aggregate composed of a set of volumes that are exposed to clients. Data of the set of volumes may be stored within the multi-tier storage environment such as within the first storage tier and as objects within the remote object store of the second storage tier. An object may be assigned a name based upon a volume identifier of a volume (e.g., a buftree UUID uniquely identifying the volume), of the composite aggregate, to which the object belongs. For example, a prefix of the name may be derived from the volume identifier. The name may also be derived from a sequence number uniquely assigned to the object. For example, the prefix of the name may be derived from the sequence number. Monotonically increasing sequence numbers may be assigned to objects that are created within the remote object store for a volume (e.g., sequence numbers may be unique for a particular buftree UUID, but not across buftree UUIDs of other volumes). In an example, the name of the object may be derived from a hash for the volume identifier and/or the sequence number.

The storage system may store objects within the remote object store. An object may comprise a header. The header may comprise a version of the object, an indicator as to whether the object is encrypted, a creation timestamp for the object, a volume identifier (e.g., a buftree universal identifier such as a buftree UUID), an identifier of a name of the object (e.g., a hash of the name and the buftree UUID, which can be read back after a put operation of the object into the remote object store to verify the hash), and/or other information. In one example, the header is 32 bytes or any other size of information.

The object may comprise one or more object pages corresponding to data chunks, such as data chunks derived from data moved from the first storage tier (e.g., a performance storage tier, such as a solid state storage tier or a disk storage tier) of the storage system to the remote object store. In one example, the object may comprise space for 1024 object pages, such as a first object page, a second object page, and/or other object pages. The first object page may comprise a first data chunk (e.g., 4 kilobytes of data or any other size of data) and a first context associated with the first object page.

In one example, the object may be assembled within a staging area metafile stored within the first storage tier. An object slot may represent the 1024 object pages into which data (e.g., data having physical volume block numbers (pvbns) of the first storage tier) is stored. Once the 1024 object pages are filled with data, the object is then assembled and tiered (e.g., stored) into the remote object store. It may be appreciated that the object slot may comprise any number of object pages and is not limited to 1024. It may be appreciated that an object slot may also be referred to as a block range within the staging area metafile.

The first context may comprise an indicator as to whether the object is encrypted. The first context may comprise an encryption key index used to identify an encryption key. The first context may comprise a pseudobad indicator to indicate whether data read from the local storage tier had an error such as a disk error and the data content in the object is inconsistent. The first context may comprise an indicator as to whether a RAID or storage OS marked the pseudobad error. The first context may comprise an unverified error indicator to indicate that when data read from the local storage tier resulted in an unverified RAID error. The first context may comprise a wrecked indicator that is set when data is forcefully corrupted. The first context may comprise a file block number (e.g., a location of the file block number for the first data chunk within the first volume). The first context may comprise a checksum for the first data chunk and the first context. In an example, the first context may comprise 16 bytes of information or any other size of information.

The storage system may maintain metafiles used to track information related to the creation of objects and the storage of objects to the remote object store of the multi-tiered storage environment. A volume information metafile 402, a staging area information metafile 404, an object reference metafile 406, an object information metafile 408, a staging area metafile 410, and/or an object map metafile 412 may be maintained.

The volume information metafile 402 may comprise volume information entries for a set of volumes of the aggregate (e.g., a first volume information entry for a first volume, a second volume information entry for a second volume, etc.). A volume information entry for a volume may comprise a volume identifier of the volume. The volume information entry may comprise a last assigned sequence number to the latest object created for the volume (e.g., monotonically increasing sequence numbers may be created and used to uniquely name objects of the volume). The volume information entry may comprise an object count of a number of objects of the volume stored within the remote object store. The volume information entry may comprise other information related to volumes and/or to storing objects within the remote object store, such as whether information is valid (e.g., a volume could be deleted but some volume information metafile data could remain).

The staging area metafile 410 may comprise object slots for objects that are to be assembled for tiering to the remote object store. For example, an object slot may comprise 1024 blocks (e.g., 1024 object pages) or any other number of blocks (e.g., 1024 file block numbers or physical volume block numbers (pvbns) of data within a first storage tier of the multi-tiered storage environment that is different than the remote object store, such as where the staging area metafile 410 is stored within the first storage tier for the assembly of objects that are then stored from the staging area metafile 410 within the first storage tier to the remote object store) into which data belonging to a particular volume can be stored. Once the 1024 blocks are full, then the object is assembled and stored to the remote object store. In one example, only blocks that belong to the same volume will be stored into an object slot used to assemble an object. In this way, that object belongs to that volume. When an object slot for an object is put into the staging area metafile 410, an object identifier is assigned to the object. In this way, the staging area metafile 410 is used to store data (e.g., 1024 pvbns per object) that will be assembled into an assembled object for storage into the remote object store. Object slots may have various states, such as empty, assembling where at least one block (e.g., object page) has been filled within an object slot, or full and ready to tier out to the remote object store. Because the aggregate may comprise multiple volumes, multiple object slots can be in process for assembly. The staging area metafile 410 may comprise other information related to storing objects within the remote object store.

The staging area information metafile 404 may comprise staging area information entries for object slots within the staging area metafile 410. A staging area information entry comprises an object slot state (e.g., an empty state, a created state of being partially assembled with at some least blocks (e.g., object pages) within an object slot filled, or a ready to tier state where all blocks have been filled with data). The staging area information entry comprises an assigned object identifier that has been assigned for an object to be assembled from data within the object slot (e.g., a name or identifier of an object may be derived from a sequence number for the object and/or a volume identifier of a volume to which data of the object to be assembled belongs). The staging area information entry comprises the volume identifier of the volume to which data of the object to be assembled belongs. The staging area information metafile 404 may comprise other information related to assembling and/or storing objects to the remote object store.

The object information metafile 408 may comprise object information entries indexed by object identifiers. An object information entry for an object identifier of an object comprises a volume identifier of a volume to which the object belongs. The object information entry comprises a sequence number assigned to the object. The object information entry comprises a state of the object identifier (e.g., a free state where the object identified has not been allocated/used but has an object slot within the staging area metafile 410; a creating state for an object being assembled, a valid state of an object already stored into the remote object store, a waiting state, etc.). The object information metafile 408 may comprise other information related to creating and/or storing objects to the remote object store.

The object reference metafile 406 may specify numbers of references from the aggregate or a volume of the aggregate to object identifiers of objects. For example, object reference metafile 406 may specify how many places in the aggregate are pointing to an object since an object can have 1024 blocks of data and thus could have up to 1024 pointers with different pvbns from the first storage tier where the block are temporarily staged within the staging area metafile 410 stored within the first storage tier. In an example, the object reference metafile 406 is a bitmap. In another example, the object reference metafile 406 comprises a 32 bit number (or any other size) for each object identifier to indicate the number of references to corresponding objects. The object reference metafile 406 may comprise other information related to creating and/or storing objects to the remote object store.

The object map metafile 412 may comprise bits set to indicate whether object identifiers of objects are allocated or not allocated. For example, the object map metafile 412 may comprise 1 bit per object identifier. The bit may be set to a first value to indicate that the object identifier is allocated. The bit may be set to a second value to indicate that the object identifier is not allocated and is free. There is a one-to-one correspondence between the object reference metafile 406 and the object map metafile 412.

Some metafiles may be verified during a mount operation, while other metafiles may be verified after the mount operation. Distributed checks may be performed upon information from multiple metafiles for verification due to reliance/interdependence between metafiles.

Figure 5:
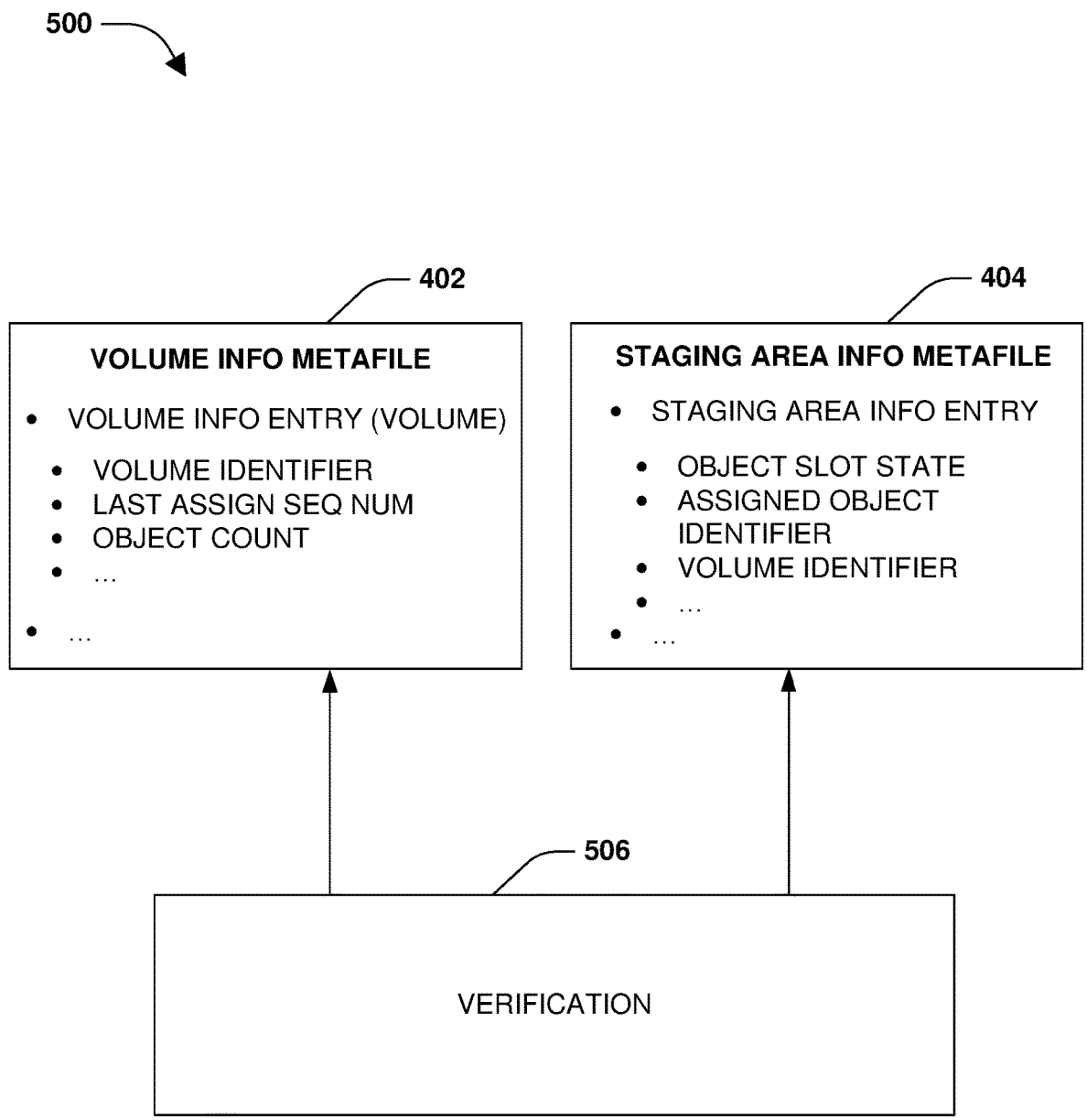
FIG. 5 is a component block diagram illustrating an exemplary computing device for storage tier verification checks, where a volume information metafile and a storage area information metafile are verified.

During the mount operation, the volume information metafile 402 and/or the staging area information metafile 404 may be verified 506, as illustrated in FIG. 5. In one example, indirect blocks and/or other basic volume information (e.g. header magic) within the volume information metafile 402 is verified (e.g., checked against information within other metafiles such as the staging area information metafile 404). After mount, object counts, last assigned sequence numbers, and/or other information in the volume information metafile 402 is verified. In another example, indirect blocks and/or other basic staging area information (e.g., header magic) within the staging area information metafile 404 is verified. After mount, object slot states, assigned object identifiers, and/or volume identifiers may be verified. Any inconsistencies or errors can be addressed, such as by modifying the volume information metafile 402 and/or the staging area information metafile 404. Upon completion of the mount operation, client access to data of the aggregate may be provided.

At 302 of FIG. 3, a determination may be made that the mount operation of the aggregate has completed. At 304, a first metafile, a second metafile, and/or other metafiles such as the volume information metafile 402, the staging area information metafile 404, the object reference metafile 406, the object information metafile 408, the staging area metafile 410, and/or the object map metafile 412 may be maintained. At 306, a distributed verification between the first metafile and the second metafile may be performed to identify an inconsistency based upon a first set of storage information of the first metafile not being consistent with a second set of storage information of the second metafile. During the distributed verification, a garbage collection process configured to perform garbage collection of old data stored within the remote object store (e.g., freeing/deallocating blocks no longer used to store active data), a mirroring process configured to mirror data from a source to a destination, a tiering process configured to tier data between the first storage tier of the multi-tier storage environment (e.g., where the metafiles are locally stored and where objects are assembled) and the remote object store (e.g., where objects are remotely stored), and/or other processes that may otherwise modify metafile data may be blocked or suspended. Client access to the aggregate may be facilitated during the distributed verifications (e.g., clients may read data and/or write data to the multi-tier storage environment (e.g., clients may be allowed to only write to a local storage tier) during the distributed verifications). At 308, a reconciliation of the first set of storage information and the second set of storage information may be performed to make the first metafile and the second metafile consistent. Client reads can be served and client access to metafiles not yet completely verified (e.g., ironed out) can be facilitated by utilizing the lazy distributed checks of merely verifying (e.g., ironing) paths that are required to serve the client reads.

Figure 6:
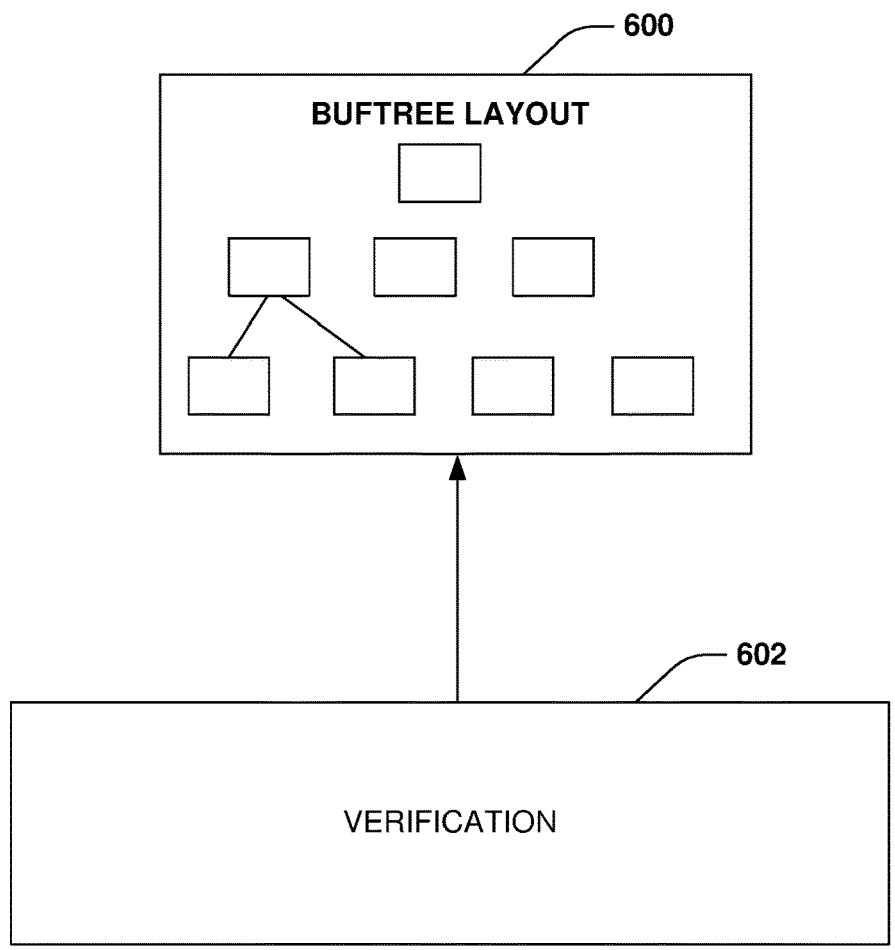
FIG. 6 is a component block diagram illustrating an exemplary computing device for storage tier verification checks, where a buftree layout is verified.

In one example of performing a verification after completion of the mount operation, a buftree verification 602 of files may be performed to determine whether buftree layouts of the files are correct, as illustrated in FIG. 6. For example, the buftree verification 602 may be performed for a buftree layout 600 corresponding to a hierarchical structure of blocks and/or indirect blocks that can be traversed to access a target data block.

Figure 7:
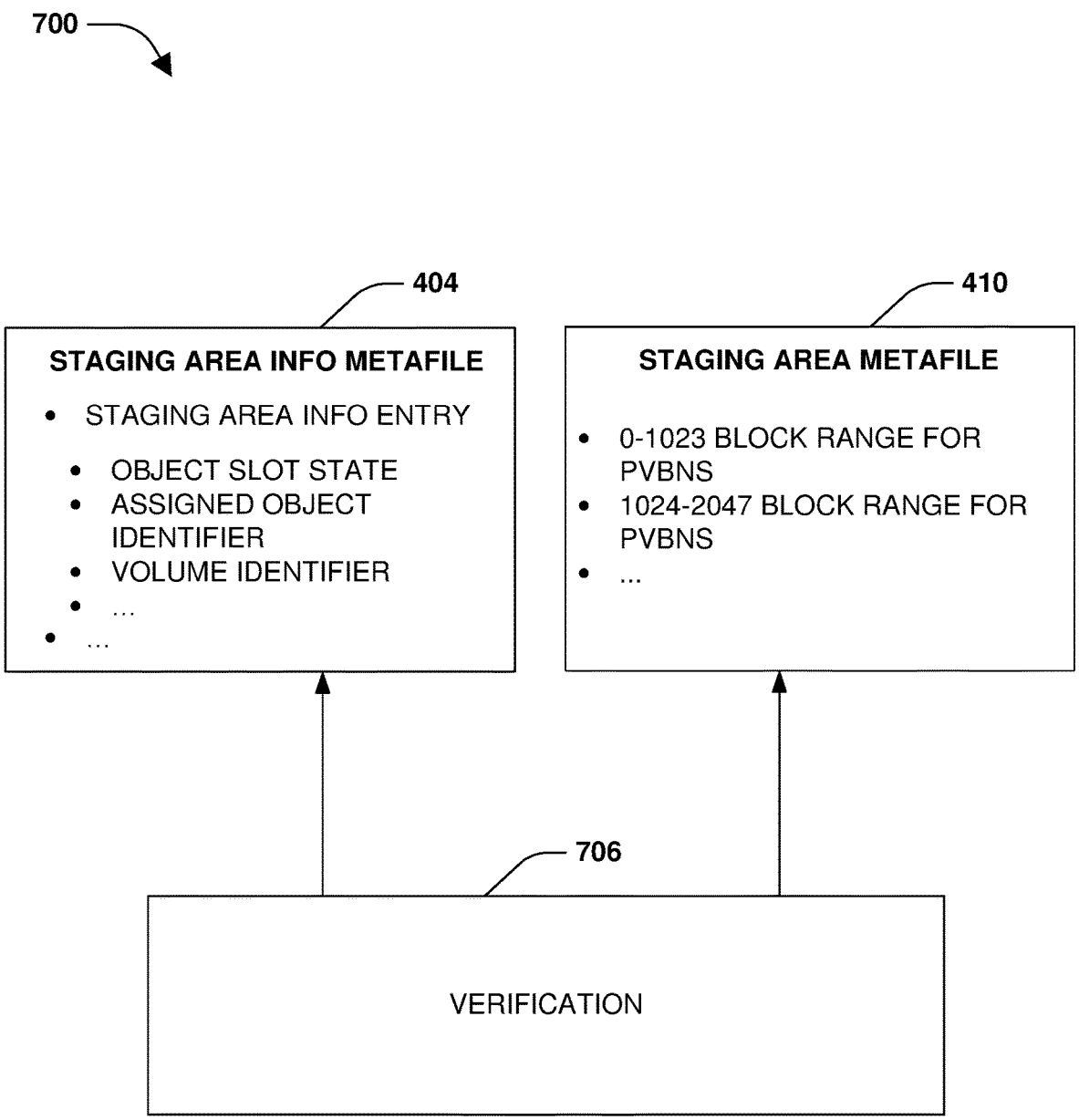
FIG. 7 is a component block diagram illustrating an exemplary computing device for storage tier verification checks, where a staging area information metafile and a staging area metafile are verified.

In one example of performing a distributed verification, a verification 706 is performed for the staging area information metafile 404 and/or the staging area metafile 410, as illustrated in FIG. 7. For each object slot of the staging area metafile 410 (e.g., an object slot corresponding to a 1024 block range (e.g., 1024 object pages) to store pvbns of data to assemble into an object for storage into the remote object store), the staging area metafile 410 is evaluated to determine a first status of blocks (e.g., object pages) sorted within the object slot (e.g., a count of blocks that the staging area metafile 410 thinks are filling the 1024 block range). The staging area information metafile 404 may be evaluated to determine a second status of blocks assigned to the object slot (e.g., a count of blocks that the staging area information metafile 404 thinks are filling the 1024 block range or a status indicating that either zero blocks have been assigned (e.g., an available status) or at least one block as being assigned (e.g., a creating/assembling status)). A reconciliation may be performed so that the first status and the second status are consistent in response to the first status not matching or corresponding to the second status (e.g., the object slot state may be changed to a different state, data within the block range may be cleared, etc.).

Figure 8:
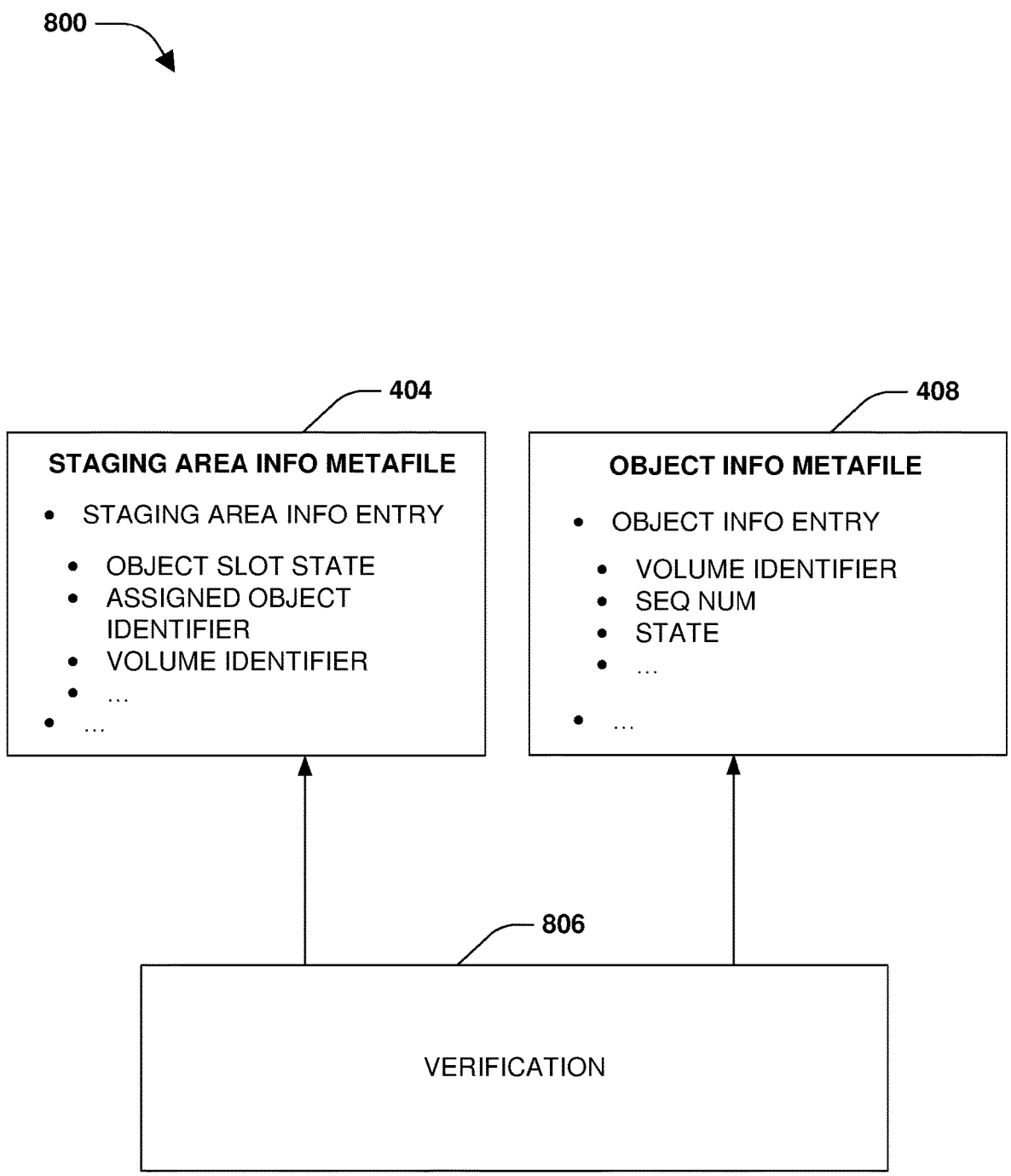
FIG. 8 is a component block diagram illustrating an exemplary computing device for storage tier verification checks, where a staging area information metafile and an object information metafile are verified.

In one example of performing a distributed verification, a verification 806 is performed for the staging area information metafile 404 and/or the object information metafile 408, as illustrated in FIG. 8. For respective object identifiers within the object information metafile 408 (e.g., each object information entry corresponds to an object identifier of an object), a state of an object may be determined as being a creating state. The creating state may indicate that at least one block has filled some of a 1024 block range of an object slot for assembling the object. The staging area information metafile 404 (e.g., which may have been previously verified and made consistent by the verification 706 of FIG. 7) may be queried using the object identifier to determine a utilization state (e.g., an object slot state) of the object slot of the object. Responsive to the utilization state indicating that the object slot is available, the creating state within the object information metafile 408 is cleared to match the utilization state from the staging area information metafile 404. That is, the utilization state indicating that the object slot is available (does not comprise any data filling the 1024 block range) is inconsistent with the creating state indicating that at least one block has filled some of the 1024 block range. Because the staging area information metafile 404 may have been previously verified and made consistent by the verification 706 and comprises more consistent data, the utilization state within the staging area information metafile 404 is used to clear/update the state within the object information metafile 408 in order to make the object information metafile consistent.

Figure 9:
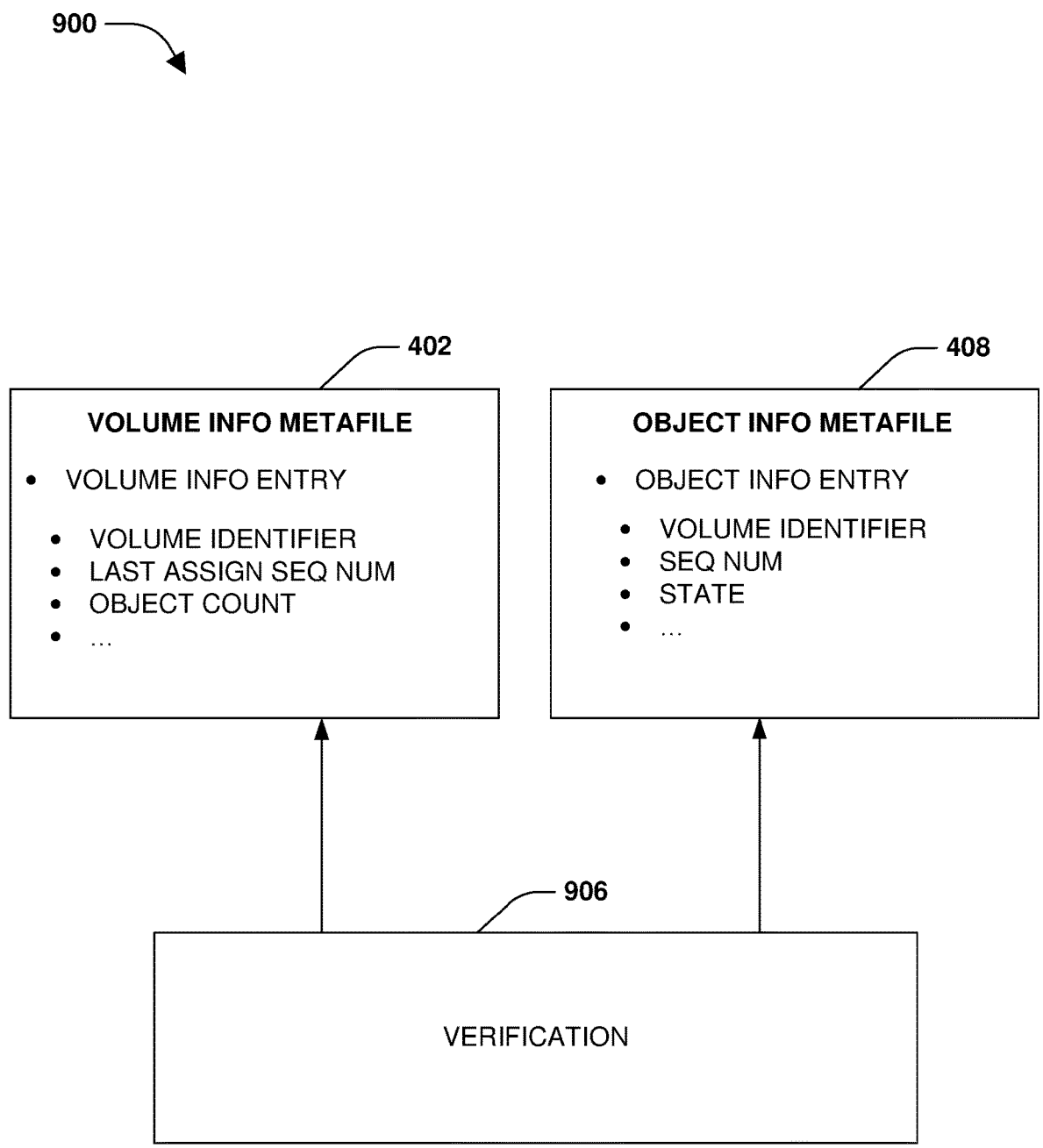
FIG. 9 is a component block diagram illustrating an exemplary computing device for storage tier verification checks, where a volume information metafile and an object information metafile are verified.

In one example of performing a distributed verification, a verification 906 is performed for the volume information metafile 402 and/or the object information metafile 408, as illustrated in FIG. 9. The volume information metafile 402 may be queried to identify the last assigned sequence number for the volume and the number of objects of the volume stored into the remote object store and/or other information. The object information metafile 408 may be queried to identify a sequence number for an object and/or other information. Responsive to the sequence number being greater than the last assigned sequence number and/or other information being inconsistent, the last assigned sequence number within the volume information metafile 402 may be modified based upon the sequence number within the object information metafile 408 (e.g., modifying sequence numbers to the larger of the two values to move incrementally forward and not incrementally backward in sequence numbers). In this way, the volume information metafile 402 may be verified and/or made consistent.

Figure 10:
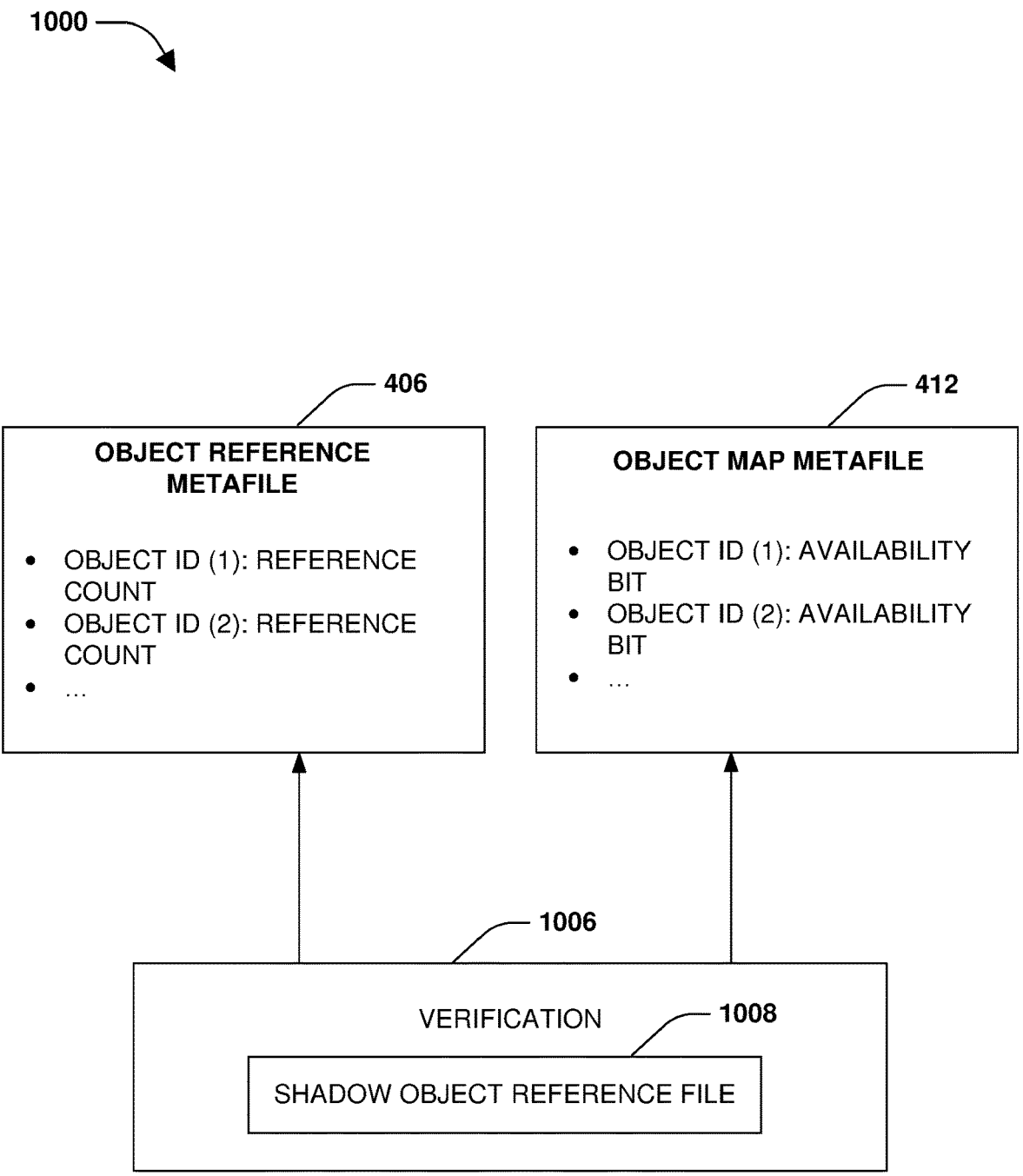
FIG. 10 is a component block diagram illustrating an exemplary computing device for storage tier verification checks, where an object reference metafile and an object map metafile are verified.

In one example of performing a distributed verification, a verification 1006 is performed for the object reference metafile 406 and/or the object map metafile 412, as illustrated in FIG. 10. A shadow copy of the object reference metafile, specifying numbers of references (e.g., pointers) from the aggregate or a volume to object identifiers of objects, may be created. A file system of the volume of the aggregate may be walked through using the shadow copy to increment object reference counts of objects references through the volume to create a shadow object reference file 1008. The shadow object reference file 1008 is an up-to-date (e.g., correct) indicator of how many times objects are referenced by the aggregate such as by the volume. The object reference metafile 406 may be updated to match the shadow object reference file 1008. The object map metafile 412, comprising bits set to indicate whether object identifiers of objects are allocated, is updated based upon the shadow object reference file 1008. For example, a bit is set to indicate that an object identifier is allocated based upon the shadow object reference file 1008 indicating that the object identifier has an object reference count greater than 0.

In one embodiment of performing a lazy distributed check, a request is received from a client to access a data block of a file associated with a tree structure representing data blocks of the file (e.g., a hierarchical structure of direct blocks, indirect blocks, etc.). A set of blocks that will be encountered for traversing the tree structure to reach the data block may be identified. Instead of verifying the entire tree structure, merely the set of blocks are verified. For example, verification is performed upon indexes of the set of blocks. In another example, merely the data block is verified (e.g., an index is used to directly identify the data block in the tree structure). Upon successful verification of the set of blocks, access is provided to the data block.

In one embodiment, an avoidance mechanism, such as an incremental checksum and an incremental consistency checker, are provided to defer distributed checks to a background processing state. The incremental checksum aids in protecting against software scribbles and the incremental consistency checker helps protect against software logical bugs. An incremental checksum is provided to identify illegal modifications to a buffer by regulating all legal modifications through standard interfaces and maintaining an up-to-date checksum of the whole buffer incrementally each time the buffer is modified. An illegal (e.g., random scribble) modification will be stopped by the standard interface and will not update the checksum appropriately. At the time of writing a corresponding block to disk, a checksum of the entire buffer is computed and compared against the maintained checksum. If there is not a match, then the buffer has been modified without updating the checksum.

An incremental consistency checker records incremental updates to buftree indirects through an indirect update API. Whenever a child virtual block number (vbn) is updated in an indirect, the incremental consistency checker tracks the old vbn as freed and the new vbn as allocated. An assigned vbn (wb_vol_bno) of an indirect is tracked. If a freed indirect's newly assigned vbn is not in a set of vbns going down to disk, then an accounting is made to ensure all of its children are accounted as free. For example with a truncated indirect, there is no update to the indirect itself but the children are freed.

Each free is accounted as a decrement in a refcount (e.g., a count of references to a block) and each allocation is accounted as an increment to the refcount. When a bitmap block is going to disk, there is a check that the increment or decrement accounted for is the same an increment or decrement in the bitmap buffer. To reduce performance overhead of the comparisons, they can be done at time of a raid checksum computation. Using the indirect update, APIs can account the blocks at the inode level. These per inode counters are matched with a delta of the actual counts in inodes going to disk.

In one example, hardware errors or logical bugs can escape avoidance layer. Accordingly, local checks are done so that there are no local inconsistencies. These local checks are done before giving access to clients. This is a version of metadata checks, which verifies all indices for indirect blocks. Some additional checks are done on metafile L0 blocks to enable for debug builds and non-debug builds.

In one example, inline distributed checks are performed for client access. Such checks do not add latency to a client path as zero extra blocks are loaded for doing these checks. In another example, inode/volume block accounting is performed. Some counters at a volume level are verified. As new writes can happen before blocks are accounted for, there can be overflow or underflow of these counters. So, block accounting code is made resilient to not panic in such scenarios. In another example, index based verification is provided where verification is provided at an index level instead of a block level, which helps allow client operations to run even while a block is being verified.

Figure 4:
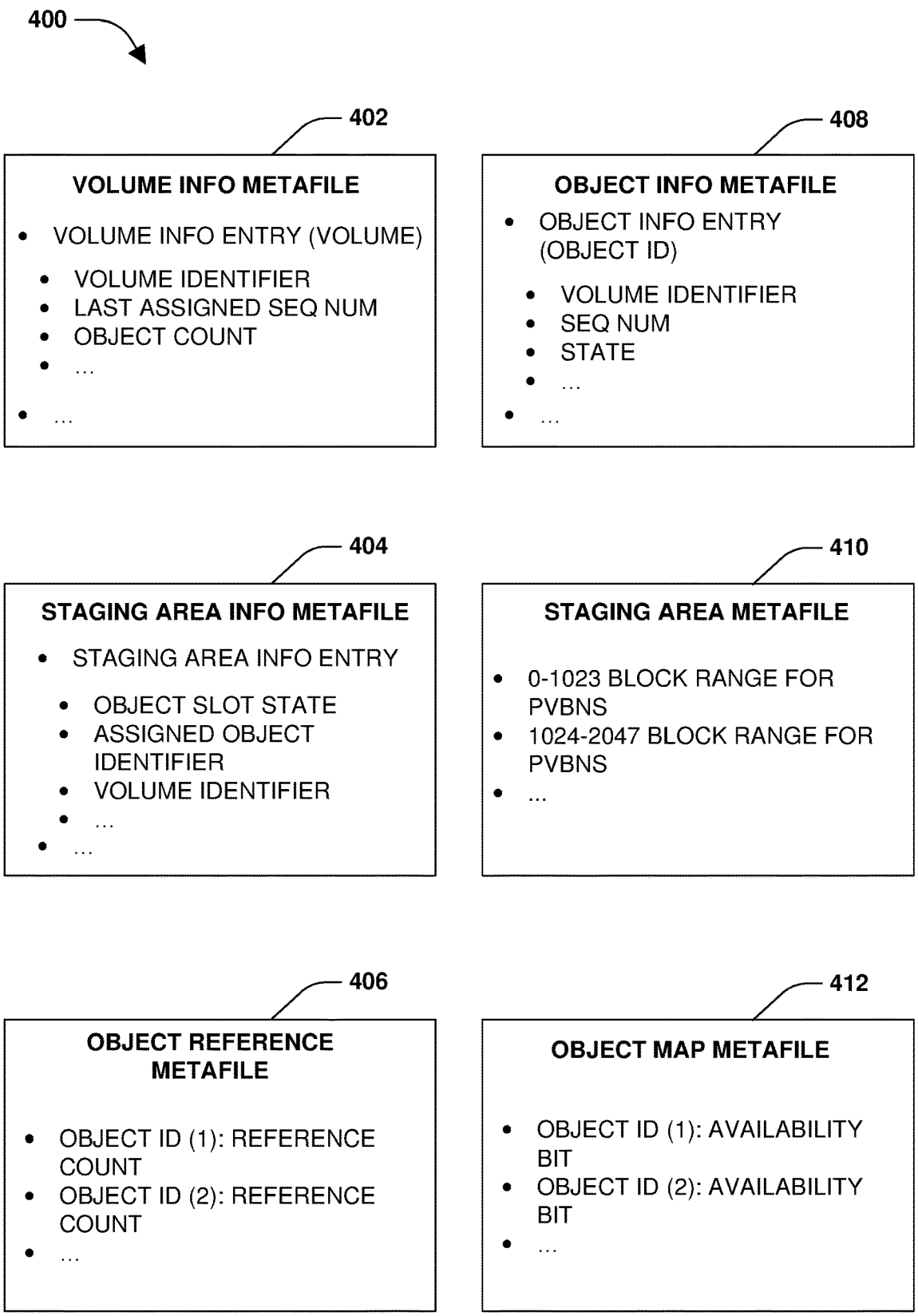
FIG. 4 is a component block diagram illustrating an exemplary computing device for storage tier verification checks.
Figure 11:
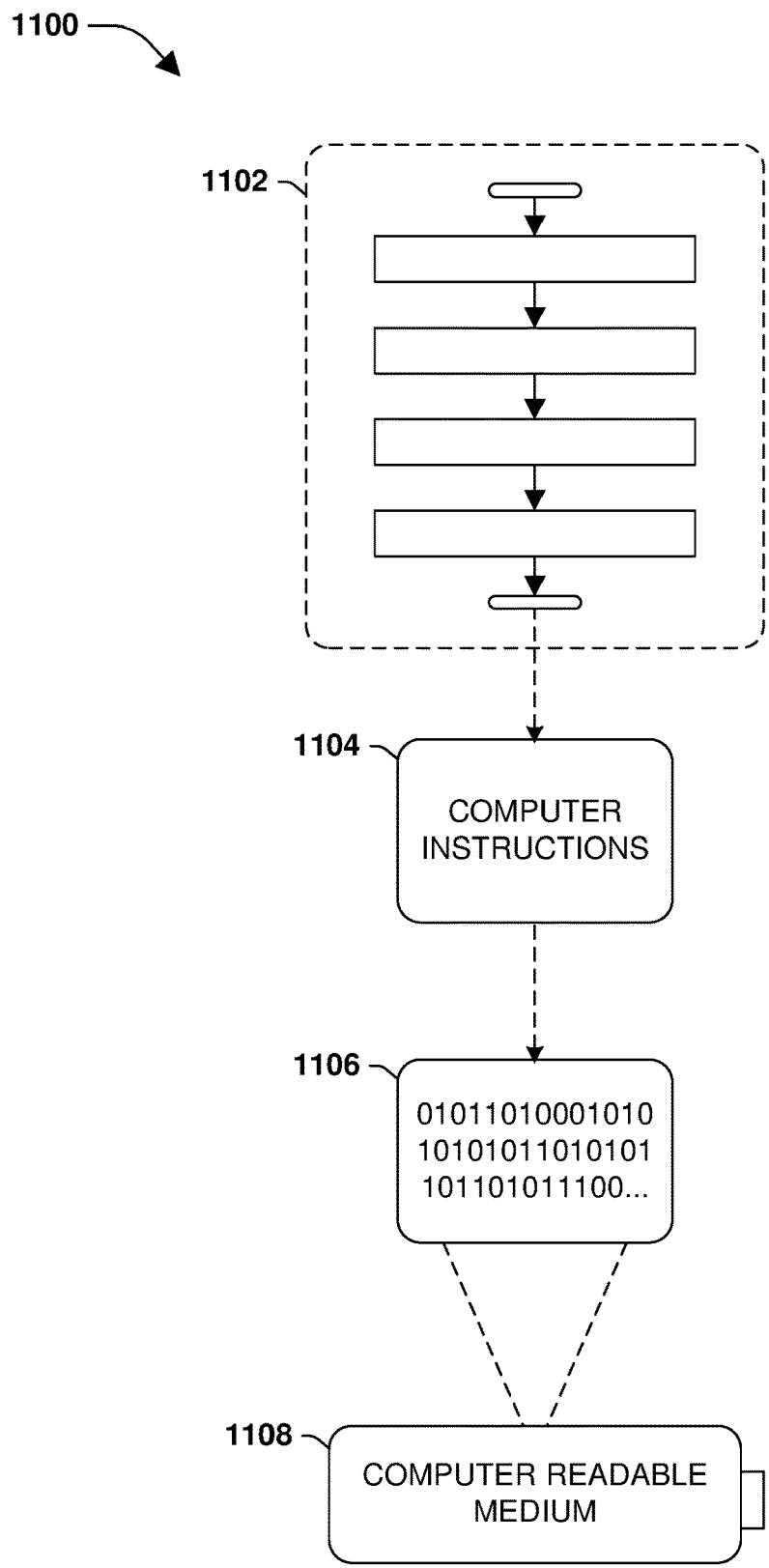
FIG. 11 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 11, wherein the implementation 1100 comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises a processor-executable computer instructions 1104 configured to operate according to one or more of the principles set forth herein. In some embodiments, the processor-executable computer instructions 1104 are configured to perform a method 1102, such as at least some of the exemplary method 300 of FIG. 3, for example. In some embodiments, the processor-executable computer instructions 1104 are configured to implement a system, such as at least some of the exemplary system 400 of FIG. 4, at least some of the exemplary system 500 of FIG. 5, at least some of the exemplary system 600 of FIG. 6, at least some of the exemplary system 700 of FIG. 7, at least some of the exemplary system 800 of FIG. 8, at least some of the exemplary system 900 of FIG. 9, and/or at least some of the exemplary system 1000 of FIG. 10, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium comprising instructions for performing a method, which when executed by a machine, causes the machine to:
    verify a volume information metafile, of an aggregate within a multi-tier storage environment, comprising a volume information entry specifying a volume identifier of a volume of the aggregate, a last assigned sequence number for an object of the volume stored to a remote object store, and a number of objects of the volume stored within the remote object store; and
    verify a staging area information metafile comprising a staging area information entry specifying an object slot state of an object slot used to store data for assembly into an assembled object, an assigned object identifier for the assembled object, and the volume identifier of the volume to which the assembled object belongs, wherein access to the aggregate is provided upon verification of the volume information metafile and the staging area information metafile during a mount operation.

2. The non-transitory machine readable medium of claim 1, wherein the instructions cause the machine to:
    perform a distributed verification between the staging area information metafile and a staging area metafile.

3. The non-transitory machine readable medium of claim 2, wherein the instructions cause the machine to:
    block a tiering process, configured to tier data between a storage tier and the remote object store, during the distributed verification.

4. The non-transitory machine readable medium of claim 1, wherein the instructions cause the machine to:
    query the staging area information metafile using a first object identifier to determine a utilization state of a first object slot of the first object, wherein a creating state is modified within object information metadata to match the utilization state based upon the utilization state indicating that the first object slot is available.

5. The non-transitory machine readable medium of claim 1, wherein the instructions cause the machine to:
    modify the last assigned sequence number within the volume information metafile based upon a sequence number, within an object information metafile, being greater than the last assigned sequence number.

6. The non-transitory machine readable medium of claim 1, wherein the instructions cause the machine to:
create a shadow copy of an object reference metafile specifying numbers of references from the aggregate to object identifiers of objects.

7. The non-transitory machine readable medium of claim 6, wherein the instructions cause the machine to:
walk through a file system of the volume using the shadow copy to increment object reference counts of objects referenced through the volume to create a shadow object reference file.

8. The non-transitory machine readable medium of claim 7, wherein the instructions cause the machine to:
update an object map metafile, comprising bits set to indicate whether object identifiers of objects are allocated, based upon the shadow object reference file.

9. The non-transitory machine readable medium of claim 1, wherein the instructions cause the machine to:
perform a buftree verification of files of the volume to determine whether buftree layouts of the files are correct.

10. A method comprising:
verifying a volume information metafile, of an aggregate within a multi-tier storage environment, comprising a volume information entry specifying a volume identifier of a volume of the aggregate, a last assigned sequence number for an object of the volume stored to a remote object store, and a number of objects of the volume stored within the remote object store; and
verify a staging area information metafile comprising a staging area information entry specifying an object slot state of an object slot used to store data for assembly into an assembled object, an assigned object identifier for the assembled object, and the volume identifier of the volume to which the assembled object belongs, wherein access to the aggregate is provided upon verification of the volume information metafile and the staging area information metafile during a mount operation.

11. The method of claim 10, comprising:
performing a distributed verification between the staging area information metafile and a staging area metafile.

12. The method of claim 11, comprising:
blocking a tiering process, configured to tier data between a storage tier and the remote object store, during the distributed verification.

13. The method of claim 10, comprising:
querying the staging area information metafile using a first object identifier to determine a utilization state of a first object slot of the first object, wherein a creating state is modified within object information metadata to match the utilization state based upon the utilization state indicating that the first object slot is available.

14. The method of claim 10, comprising:
modifying the last assigned sequence number within the volume information metafile based upon a sequence number, within an object information metafile, being greater than the last assigned sequence number.

15. The method of claim 10, comprising:
creating a shadow copy of an object reference metafile specifying numbers of references from the aggregate to object identifiers of objects.

16. The method of claim 15, comprising:
walking through a file system of the volume using the shadow copy to increment object reference counts of objects referenced through the volume to create a shadow object reference file.

17. The method of claim 16, comprising:
updating an object map metafile, comprising bits set to indicate whether object identifiers of objects are allocated, based upon the shadow object reference file.

18. The method of claim 10, comprising:
performing a buftree verification of files of the volume to determine whether buftree layouts of the files are correct.

19. A computer, comprising:
a memory comprising instructions; and
a processor configured to execute the instructions to:
verify a volume information metafile, of an aggregate within a multi-tier storage environment, comprising a volume information entry specifying a volume identifier of a volume of the aggregate, a last assigned sequence number for an object of the volume stored to a remote object store, and a number of objects of the volume stored within the remote object store; and
verify a staging area information metafile comprising a staging area information entry specifying an object slot state of an object slot used to store data for assembly into an assembled object, an assigned object identifier for the assembled object, and the volume identifier of the volume to which the assembled object belongs, wherein access to the aggregate is provided upon verification of the volume information metafile and the staging area information metafile during a mount operation.

20. The computer of claim 19, wherein the instructions cause the processor to:
perform a distributed verification between the staging area information metafile and a staging area metafile.

* * * * *